United States Patent
Wrage et al.

(10) Patent No.: US 9,404,582 B2
(45) Date of Patent: Aug. 2, 2016

(54) SEAL ARRANGEMENT FOR A ROTATING SHIP PROPELLER SHAFT

(71) Applicant: Blohm + Voss Industries GmbH, Hamburg (DE)

(72) Inventors: Marko Wrage, Struvenhuetten (DE); Carlos Fangauf, Hamburg (DE)

(73) Assignee: Blohm + Voss Industries GmbH, Hamburg (DE)

( * ) Notice: Subject to any disclaimer, the term of this patent is extended or adjusted under 35 U.S.C. 154(b) by 649 days.

(21) Appl. No.: 13/833,800

(22) Filed: Mar. 15, 2013

(65) Prior Publication Data

US 2014/0048461 A1 Feb. 20, 2014

(30) Foreign Application Priority Data

Aug. 18, 2012 (DE) .......................... 10 2012 016 447

(51) Int. Cl.
| | |
|---|---|
| *B01D 35/00* | (2006.01) |
| *F16J 9/00* | (2006.01) |
| *F16N 39/00* | (2006.01) |
| *F16J 15/32* | (2016.01) |
| *F16N 7/36* | (2006.01) |
| *B63H 23/32* | (2006.01) |
| *F16J 15/40* | (2006.01) |

(52) U.S. Cl.
CPC ............ *F16J 15/3232* (2013.01); *B63H 23/321* (2013.01); *F16J 15/406* (2013.01); *F16N 7/36* (2013.01)

(58) Field of Classification Search
None
See application file for complete search history.

(56) References Cited

U.S. PATENT DOCUMENTS

| | | | | |
|---|---|---|---|---|
| 3,631,834 A | * | 1/1972 | Gardner ................. | B63H 23/36 277/432 |
| 3,810,487 A | * | 5/1974 | Cable ........................ | B60P 3/14 137/351 |
| 3,855,987 A | * | 12/1974 | Green ...................... | F01C 21/04 123/196 R |
| 4,328,549 A | * | 5/1982 | Avery ..................... | B29C 44/60 264/321 |
| 4,618,417 A | * | 10/1986 | Yamanouchi .......... | F02M 31/16 210/149 |
| 4,829,850 A | * | 5/1989 | Soloy ....................... | B64D 7/00 248/554 |
| 4,984,811 A | | 1/1991 | Kuwabara et al. | |
| 5,374,208 A | | 12/1994 | von Bergen et al. | |

(Continued)

FOREIGN PATENT DOCUMENTS

| | | |
|---|---|---|
| DE | 37 42 079 | 6/1989 |
| DE | 44 34 247 | 3/1996 |

(Continued)

OTHER PUBLICATIONS

European Search Report for European Patent Application No. EP 13 00 0498, dated Jun. 19, 2013, 2 pages, Muenchen, Germany, with English translation, 2 pages.

*Primary Examiner* — Nam Nguyen
*Assistant Examiner* — Richard Gurtowski
(74) *Attorney, Agent, or Firm* — W. F. Fasse

(57) ABSTRACT

A seal arrangement for a ship's propeller shaft includes at least one oil-filled seal chamber bounded by seal rings around the shaft, as well as an oil reservoir tank, an oil supply line connecting the tank to the bottom portion of the seal chamber, an oil circulation pump interposed in the supply line between the tank and the seal chamber, and an oil return line communicating from the upper portion of the seal chamber back to the tank. Thereby, oil is continuously circulated through the seal chamber, and thereby flushes out any contaminant particles, air or water that might enter the seal chamber.

20 Claims, 2 Drawing Sheets

(56) References Cited

U.S. PATENT DOCUMENTS

| | | | | |
|---|---|---|---|---|
| 5,419,724 A | * | 5/1995 | Wyland | B63H 23/321 440/79 |
| 5,643,026 A | | 7/1997 | Pietsch et al. | |
| 6,481,720 B1 | * | 11/2002 | Yoshida | B63H 23/321 277/400 |
| 2014/0346738 A1 | | 11/2014 | Rusch et al. | |

FOREIGN PATENT DOCUMENTS

| | | |
|---|---|---|
| EP | 0 335 368 | 10/1989 |
| EP | 1 182 133 | 2/2002 |
| GB | 2 174 156 | 10/1986 |
| GB | 2 213 539 | 8/1989 |
| GB | 2 244 528 | 12/1991 |
| JP | 06-249346 | 9/1994 |

* cited by examiner

SEAL ARRANGEMENT FOR A ROTATING SHIP PROPELLER SHAFT

PRIORITY CLAIM

This application is based on and claims the priority under 35 USC 119 of German Patent Application 10 2012 016 447.5, filed on Aug. 18, 2012, the entire disclosure of which is incorporated herein by reference.

FIELD OF THE INVENTION

The invention relates to a seal arrangement for sealing around the rotating shaft that drives a ship's propeller, between an exterior water side and an interior side, for example where the rotating shaft passes through a stern tube or bushing that penetrates through the stern of the ship's hull.

BACKGROUND INFORMATION

Various types and configurations of seal arrangements, bushings, packing boxes, stuffing boxes and the like are known for providing a seal around the rotating shaft that drives a ship's propeller, where the shaft penetrates through the stern of the ship from the interior to the exterior of the ship's hull. The seal arrangement must effectively prevent water from the exterior environment, i.e. from the exterior of the hull below the waterline, leaking into the interior of the hull where the shaft penetrates through the hull, while still allowing the shaft to rotate. Preferably, the seal arrangement should also dissipate the frictional heat that arises due to rubbing friction of seal elements on the rotating shaft, and should allow for the removal of wear particles or other contaminants from the seal arrangement, and further should provide a long operating life and allow easy maintenance.

One known type of seal arrangement uses plural seal rings spaced axially from one another along the propeller shaft in a stern tube, thereby forming successive seal chambers respectively between successive ones of the seal rings. An outermost chamber can be filled with seawater, an intermediate chamber can be pressurized with a compressed gas such as compressed air, and a third inner chamber can be filled with oil. Such an embodiment of a seal arrangement is known from the German Patent DE 44 34 247, for example, and also see German Patent DE 37 42 079. The entire disclosures of these two German Patents are incorporated herein by reference.

In practice, it has been found that further improvements would be desirable. For example, in large ships, the oil lines supplying oil to the oil-filled chamber must be quite long, which adds to the complexity, cost and weight of the overall system.

In such known systems, there is also the danger of air passing from the pressurized air-filled chamber into the adjacent oil-filled chamber. This can cause air bubbles and foaming in the lubricating oil, and it may not be possible to completely remove these air bubbles, foam or gas inclusions from the lubricating oil via a ventilation or de-gassing line. As a result, the oil may provide an inadequate lubricating effect, which leads to more-rapid wear and premature failure or damage of the seal rings. Furthermore it has been found that the oil present in the oil-filled chamber ages prematurely and loses its required lubricating properties due to strong thermal and mechanical loads and demands being placed on this oil. Also, this oil can become contaminated with wear particles caused by wear of the seal rings and the bushing, and also can become water-contaminated due to penetration of water past the seal rings into the oil-filled chamber. It is not possible to regularly exchange the oil in the oil-filled chamber, so that after a certain time of operation, the oil's lubrication effect of the seal rings is no longer optimal, and due to the breakdown of the oil over time a chemical degradation of the seal rings may also arise.

SUMMARY OF THE INVENTION

In view of the above, it is an object of the invention to provide a relatively wear-resistant seal arrangement that achieves a long operating life between maintenance intervals, while avoiding, preventing or significantly reducing the occurrence of the problems and deficiencies of known seal arrangements, for example as discussed above. Furthermore, the invention aims to provide such a seal arrangement that makes it possible to remove any gas bubbles or inclusions, any wear particles or other contaminants, any water contaminant, and excess heat from the oil in the oil-filled chamber. The invention further aims to provide a robust and highly effective and functional arrangement for sealing a ship's propeller shaft, while avoiding or overcoming the disadvantages of the prior art, and achieving additional advantages as apparent from the present specification. The attainment of these objects is, however, not a required limitation of the claimed invention.

The above objects have been achieved according to the invention in a seal arrangement beginning from the generally known arrangement discussed above, wherein further according to the invention, an oil supply line and an oil return line connect the oil-filled chamber of the seal arrangement with an oil reservoir tank, and an oil circulation pump is provided in the oil supply line between the tank and the oil-filled chamber of the seal arrangement. Further particularly in a preferred embodiment, the oil supply line communicates into the lower portion e.g. lower half (preferably at the bottom) of the oil-filled chamber, while the oil return line returning to the oil tank communicates out of the upper portion e.g. upper half (preferably at the top) of the oil-filled chamber. This arrangement according to the invention achieves the advantages that a continuous flowing replacement and flushing of the oil in the oil-filled chamber is achieved, and any possible air introduced from the pressurized air chamber into the oil of the oil-filled chamber is flushed out of the chamber through the oil return line leading back to the oil reservoir tank. Similarly, any particulate contaminants or any water that get into the oil in the oil-filled chamber are also flushed out in the flow of circulating oil. When the oil is returned to the tank and recirculated, any contaminants such as air bubbles, water or particles can be removed. A continuous exchange of the oil in the seal chamber is made possible. It is also possible to continuously cool the circulating oil, thereby ensuring that the seal arrangement does not overheat.

In a further preferred embodiment of the invention, the seal arrangement additionally includes a fourth seal chamber that is also filled with oil and sealed by an outwardly directed seal ring, similar to the abovementioned oil-filled third chamber. Additionally, this embodiment preferably includes another oil reservoir tank as a high tank to achieve gravitational pressurization of the oil, as well as another circulation pump interposed in an oil supply line from the additional tank to the lower portion of the oil-filled fourth chamber, and another oil return line communicating from the upper portion of the oil-filled fourth chamber back to the additional tank. This additional oil-filled chamber and additional oil circulating system provides redundancy to the first circulation system described above and thereby improves the seal arrangement effectiveness as well as the longterm reliability thereof.

Still further, in another preferred embodiment, the seal arrangement may include a fifth seal chamber that is also filled with circulating oil, and that is similarly connected to its own separate oil reservoir tank, its own additional circulation pump in an oil supply line that communicates from this tank to the lower portion of this fifth seal chamber, and another oil return line communicating from the upper portion of this fifth seal chamber to the separate tank.

The oil reservoir tank supplying oil to the oil-filled fifth seal chamber (or any one of the tanks supplying oil to any one of the oil-filled chambers) is preferably arranged at a height from 0.5 m to 4 m above the centerline of the propeller shaft in a particular embodiment, to achieve the desired gravitational pressurization of the oil in the circulation system to the respective oil-filled chamber. In another optional feature, the oil level in the tank may be at the same height as or somewhat higher than the waterline on the ship's hull, to achieve in the oil-filled seal chamber a static pressure of the oil that is equal to or slightly higher than the water pressure of the water outside the hull at the depth of the propeller shaft.

In further alternative embodiments, the additional oil-filled fourth seal chamber and/or the additional oil-filled fifth seal chamber can be supplied with oil from one common shared oil reservoir tank, or even a single shared tank that supplies oil to all of the oil-filled chambers. It is also possible to provide only a single circulating pump in a single oil supply line, or to provide separate redundant systems as described above. The separate oil tanks and oil supply systems not only provide redundancy, but also allow different oil pressure levels to be achieved in the respective oil-filled seal chambers.

Furthermore, as a protective arrangement, a filter for filtering out or separating solid contaminant particles and/or water from the circulating oil is preferably arranged in the oil supply line between the tank and the respective connected oil-filled seal chamber. Furthermore, in order to enable a removal or draining of water from the filter that is preferably deployed as just mentioned, the system preferably further includes a sensor for detecting a water accumulation fill level in the filter or in a separate water separator, in the oil supply line between the tank and the oil-filled seal chamber.

As a further safety measure, the system preferably additionally includes a bypass line from the oil reservoir tank to the oil-filled seal chamber, so as to provide oil even in the event of any arising blockage of the main oil supply path including the oil circulation pump, filter etc. in the main oil supply line between the tank and the respective oil-filled seal chamber. In this regard further, an oil flow meter is preferably provided in the main oil supply line between the tank and the seal chamber, and the oil flow meter is connected to an actuator of a bypass valve in the bypass line to control the bypass line from the tank to the seal chamber.

As a further preferred feature, an oil cooler can be interposed in the oil supply line between the tank and the oil-filled seal chamber in order to cool the circulating oil and thereby reduce the temperature and the thermal loading of the oil-lubricated and oil-cooled seal arrangement. In this manner, any heat that arises from friction in the seal arrangement can be dissipated or removed. This extends the operating life of the oil and the seal arrangement.

With the above arrangement, any physical contaminant particles such as wear particles, or water contamination, or air contamination entering the oil in the oil-filled seal chamber is continuously flushed out of the seal chamber by the circulating oil. Especially any air entering the seal chamber will tend to flow or bubble to the top portion of the seal chamber, where it is readily flushed out of the seal chamber through the oil return line that communicates out of the top portion (preferably directly at the top) of the seal chamber. When this oil is circulated back into the oil reservoir tank, air inclusions in the oil tend to rise and bubble out of the relatively stagnant oil in the reservoir tank, while physical contaminant particles tend to fall and separate out of the relatively stagnant oil in the reservoir tank, where they can also be flushed out of the tank to the inline filter as discussed above. It is also easy to supplement or exchange the oil as necessary at regular maintenance intervals, without needing to disassemble or open the seal arrangement itself. Furthermore, the wear condition of the seal rings can be judged by monitoring the condition of the circulating oil, i.e. if the contaminant (air, water or particle) loading in the oil increases above an acceptable level, this indicates that the seal rings have worn beyond an acceptable level.

BRIEF DESCRIPTION OF THE DRAWINGS

In order that the invention may be clearly understood, it will now be described in further detail in connection with two example embodiments thereof, with reference to the accompanying drawings, wherein.

DETAILED DESCRIPTION OF PREFERRED EXAMPLE EMBODIMENTS AND THE BEST MODE OF THE INVENTION

Figure 1:
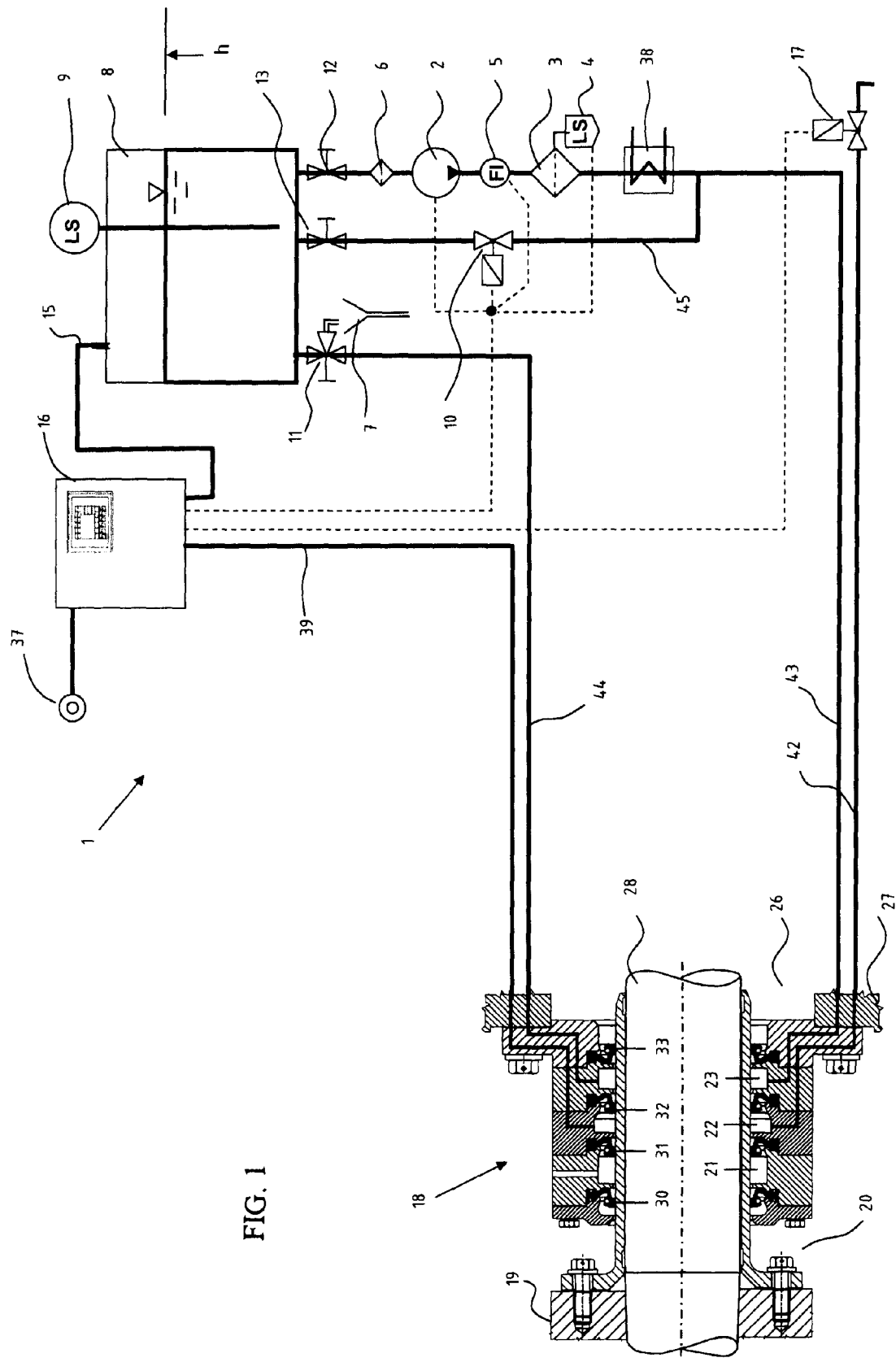
FIG. 1 is a schematic diagram of a seal apparatus according to a first embodiment, with an active oil circulation to a seal arrangement having four seal rings or seal lips.

As shown in FIG. 1, an apparatus according to the invention includes a control arrangement 1 and a seal arrangement 18 as a multiple seal for providing a seal around a propeller shaft 28 that drives a propeller 19 below the waterline outside a hull of a watercraft, after passing outwardly through a stern tube or a stern seal bush housing 27. The "watercraft" can be any ship, boat, submarine etc. that has a buoyant hull operating under, in and/or on the water, and that has a rotating shaft 28 penetrating from a hull interior side to a hull exterior side through the hull. Thus, the seal arrangement 18 is arranged and provides a seal between an exterior seawater area 20 and a lubricating oil area 26 on the interior side, e.g. in the stern tube area. The seal arrangement 18 is controlled and provided with oil and pressurized air by the control arrangement 1, as will be described below.

In the embodiment according to FIG. 1, the seal arrangement 18 includes three successive seal chambers 21, 22 and 23 axially along the propeller shaft 28. Annular chamber walls separate the successive seal chambers 21, 22 and 23 from one another, while allowing a small annular gap between the respective chamber wall and the propeller shaft. Leakage through these small annular gaps is avoided or minimized by successive seal rings 30, 31, 32 and 33 in the form of generally conical seal lips contacting the shaft 28. The seal lips or seal rings may have any known construction, configuration, arrangement, material composition, etc. for example of rubber, polymer material, composite material, soft metal, etc. Beginning from the exterior water side, a first outwardly directed seal ring 30, a second outwardly directed seal ring 31, a third outwardly directed seal ring 32, and a fourth inwardly directed seal ring 33 are arranged one after another along the axial direction of the shaft, respectively sealing the successive seal chambers therebetween. The seal ring being "outwardly directed" means that it is tilted conically toward or configured conically tapered toward the hull exterior side, while the seal ring being "inwardly directed" means that it is tilted conically toward or configured conically tapered toward the hull interior side. It may be provided that a seal ring seals more positively against flow from the direction that it is "directed" toward. The innermost seal ring 33 provides a seal relative to the lubricating oil chamber or area 26 of the stern tube 27. The outermost seal ring 30 acts especially as a dirt seal to keep exterior dirt out of the seal arrangement 18. The outermost first seal chamber 21 is filled with circulating water, e.g. seawater for cooling the seal arrangement, and the water can be discharged through a passage to the hull exterior side. The next successive second seal chamber 22 is pressurized in a controlled manner by compressed air supplied through an air supply line 39 from a compressed air source 37 via and under control of a control device 16. For example, the air pressure in the seal chamber 22 may be set to slightly below or equal to the water pressure prevailing at the propeller shaft 28 on the hull exterior side. Preferably, the air supply line 39 communicates into the top portion or directly at the top of the second seal chamber 22, and additionally a drain line 42 communicates out of the bottom of the second seal chamber 22 through a controlled drain valve 17. The drain valve 17 receives control commands from the control device 16. Thereby, the pressurized air in the second seal chamber 22 helps to prevent the penetration of seawater from the first seal chamber 21 past the second seal ring 31 into the second seal chamber 22. But if any water does enter the second seal chamber 22, it can be drained through the drain line 42 by opening the drain valve 17 as required.

The third seal chamber 23 is filled with oil, which circulates to and from an oil reservoir tank 8. Namely, an oil supply line 43 connects the tank 8 preferably to the lower portion, e.g. the lower half or preferably directly at the bottom of the third seal chamber 23, and an oil return line 44 communicates preferably from the top portion, e.g. the upper half or preferably directly at the top, of the third seal chamber 23 back to the tank 8. This allows any air bubbles entering the oil-filled chamber 23 to be flushed out via the return line 44.

In an alternative embodiment that is not illustrated, the oil supply line 43 may enter the chamber 23 at about mid-height thereof, and the oil return line 44 may connect both to a vent port at the top of the chamber 23 and to a drain port at the bottom of the chamber 23. Thereby, the circulating oil flow can flush air bubbles out of the chamber 23 through the top vent port and can flush water or solid particles out of the chamber 23 through the bottom drain port, because the air bubbles tend to float upward while water and solid particles tend to fall downward.

The oil reservoir tank 8 is pressurized by compressed air that is provided from the compressed air source 37 through a pressurizing line 15 via and controlled by the control device 16. Thereby, the oil circulating from the tank 8 to the third seal chamber 23 is pressurized to an appropriate pressure level in the seal chamber 23 so as to relieve the seal rings 32 and 33 of excess pressure, dependent on the pressure in the second seal chamber 22 that is pressurized with the compressed air also provided from the compressed air source 37. Namely, the compressed air provided to the second seal chamber 22 will not tend to blow or bubble past the seal ring 32 into the third seal chamber 23, because the oil pressure in the chamber 23 is at least equal to or slightly greater than the air pressure in the chamber 22. The oil pressure in the chamber 23 can be regulated or increased dynamically, by throttling the circulation flow thereof in the circulation arrangement to be described next.

To provide a forced positive oil circulation through the third seal chamber 23 via the supply line 43 and the return line 44, a circulation pump 22 is interposed in the oil supply line 43 between the tank and the seal chamber. Furthermore, shut-off valves 11, 12 and 13 are connected to the tank 8. The valve 11 connects to the oil return line 44, the valve 12 connects to the oil supply line 43, and the valve 13 connects to a bypass line 45 to be described below. By partially closing or throttling the shut-off valve 11, the circulation flow of oil driven by the pump 2 produces a dynamic back pressure, which can further adjust or regulate the oil pressure in the seal chamber 23 as mentioned above. On the other hand, the valve 11 can be fully opened and the valve 12 can be adjusted to avoid overpressuring the seal chamber 23, or in this regard the circulating pump 2 may be a variable flow pump with an adjustable speed to vary the flow and thereby vary the dynamic pressure conditions in the seal chamber 23. Additionally, the valve 11 may have a drain port through which oil can be drained from the reservoir tank 8 into a catch basin or catch funnel 7 that drains away the oil, for example into the bilge of the ship or into an oil removal container, for example during an oil replacement maintenance procedure. Also, when refilling the tank or occasionally supplementing the oil in the tank 8, overflow protection is provided by a float switch or level switch 9 in the tank 8.

Preferably, the circulation loop includes additional elements to provide additional benefits and features of the system. For example, in the illustrated embodiment, a contaminant trap or screen 6 for protecting the pump 2 is arranged in the supply line 43 upstream from the pump 2. Additionally, a filter 3 for removing finer contaminants (e.g. particles and/or water) is arranged downstream from the pump 2, and is preferably equipped with a water sensor, which may simply be a float switch or level switch 4 that detects the accumulation of water in the filter 3 of the supply line 43. This detector or switch 4 can trigger a corresponding alarm or water accumulation indication via the control device 16. In order to remove excess heat from the oil and thereby increase the operating lifetime of the seal rings 32 and 33, an oil cooler 38 is preferably additionally interposed in the oil supply line 43. Additionally, an oil flow meter 5 is preferably arranged in the supply line 43 to measure the oil flow rate. This oil flow meter 5 is connected to the control device 16 and to a bypass valve 10 arranged in the bypass line 45. Thus, when necessary, e.g. if the main oil circulation line has become blocked due to an overloaded filter or the like, the oil flow meter 5 can cause the bypass valve 10 to be actuated to actuate the bypass line 45 from the tank 8 and also generate or trigger an alarm signal. In this regard, the valve 10 may also be connected for signal transmission with the circulation pump 2 and the water detector or level sensor 4. Thus, the bypass line 45 bypasses and provides another flow path parallel to the contaminant trap or screen 6, the circulation pump 2, the oil flow meter 5, the filter 3, and the oil cooler 38.

Thereby, with the above components interposed in the oil supply line 43, and the oil return line 44 providing a circulation loop back to the tank 8, the inventive arrangement provides a continuous flushing, cleaning, degassing and cooling of the oil that is continuously circulated through the oil-filled third seal chamber 23.

Figure 2:
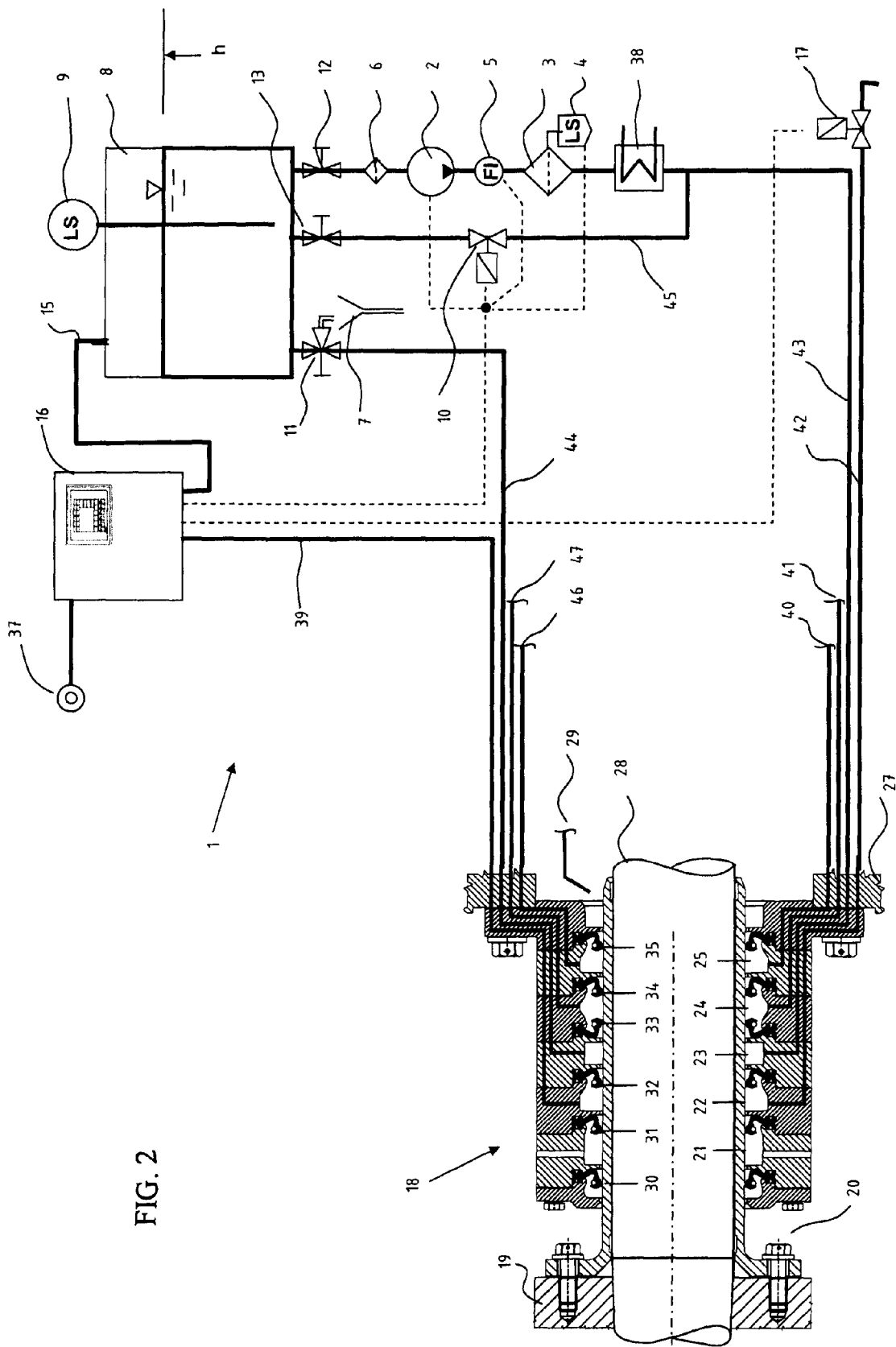
FIG. 2 is a schematic diagram of an apparatus according to a second embodiment similar to that of FIG. 1, but having a total of six seal rings or seal lips forming five successive seal chambers in the seal arrangement.

In the further embodiment according to FIG. 2, the apparatus basically incorporates the embodiment according to FIG. 1, and additionally provides an oil-filled fourth seal chamber 24 and an oil-filled fifth seal chamber 25, on the interior side of the arrangement after the third seal chamber 23. The fourth and fifth chambers 24 and 25 are successively sealed by additional seal rings 34 and 35 that are oriented or directed (e.g. conically tapered or conically sloped or tilted) outwardly toward the hull exterior side. Additionally, a lubricating oil spray supply arrangement 29 is provided to spray lubricating oil onto the propeller shaft 28 in the area of the interior side of the seal arrangement 18, for example instead of the lubricating oil chamber 26 in the embodiment of FIG. 1.

Similar to the oil circulation provided for the oil-filled third seal chamber 23, additional oil circulation loops or circuits are provided for the fourth and fifth seal chamber 24 and 25. In this regard, the fourth and fifth seal chambers 24 and 25 can be supplied with circulating oil from the same common oil tank and the same common oil circulation pump as the third seal chamber 23. Alternatively, and preferably to achieve redundancy and thus greater overall reliability and/or to provide different pressures of the oil in the respective chambers, the fourth and fifth seal chambers 24 and 25 are provided with separate independent oil circulation circuits similar to the oil circulation circuit described above for the third seal chamber 23. Namely, oil supply lines 40 and 41 connect additional oil reservoir tanks (not shown) respectively to bottom portions of the fourth and fifth seal chambers 24 and 25, and additional oil return lines 46 and 47 connect the top portions of the seal chambers 24 and 25 back to the additional oil tanks (not shown) respectively. Two additional pumps (not shown) are respectively interposed in the two additional oil supply lines 40 and 41 between the respective tanks and seal chambers. Just as described above, these oil circulation circuits can also include contaminant removal screens, oil flow meters, filters, and oil coolers.

Additionally, a secondary circulation circuit (not shown) with a filter and a pump can be connected to any one of the tanks 8 (or respectively to several or all of the tanks 8) to achieve additional filtration of the oil. Such a secondary circulation circuit can simply loop back to the tank for filtering the oil and returning it to the tank, or can be provided parallel to the primary circulation circuit described above, to provide a second backup or bypass circuit in the event the primary circuit becomes clogged or disabled.

Furthermore, the height of the oil reservoir tank 8, or particularly the height h of the oil level within the tank 8, above the centerline of the shaft 28 establishes a certain gravitational potential pressurization of the oil in the oil-filled chamber(s) 23, 24 and/or 25. This gravitational pressure can be supplemented by air pressure provided from the compressed air source 37 as described above, or may be adequate without this additional active air pressurization. For example, by arranging the oil tank high above the shaft centerline as a high tank, the gravitational pressurization of the oil may be sufficient, for example depending on the height of the hull waterline above the shaft centerline. In a particular embodiment, an oil tank 8 is preferably arranged from 0.5 m to 4 m above the shaft centerline. Thereby, the gravitational pressurization of the oil is sufficient to counteract the exterior seawater pressure and prevent penetration of seawater through the seal rings into the oil-filled seal chamber(s). Thus, even if the compressed air source 37 fails or is not available (during non-operating periods of the ship), the seal arrangement will still effectively prevent the penetration of water from the exterior through the seal arrangement into the interior of the ship's hull.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims. The abstract of the disclosure does not define or limit the claimed invention, but rather merely abstracts certain features disclosed in the application.

What is claimed is:

1. A seal apparatus for sealing around a propeller shaft of a watercraft where said propeller shaft penetrates through a hull of said watercraft from a hull interior side to a hull exterior side,
    comprising a seal arrangement and an oil circulation arrangement,
    wherein said seal arrangement comprises a first oil-filled seal chamber bounded between first and second seal rings that are arranged circumferentially around said shaft and axially spaced from one another along said shaft, and
    wherein said oil circulation arrangement comprises:
    a first oil tank,
    a first oil supply line that is connected to and communicates from said first oil tank to a lower portion of said first oil-filled seal chamber,
    a first circulation pump interposed in said first oil supply line between said first oil tank and said first oil-filled seal chamber,
    a first oil return line that is connected to and communicates from an upper portion of said first oil-filled seal chamber to said first oil tank, wherein said upper portion is above said lower portion, and
    an oil in said first oil tank, said first oil supply line, said first circulation pump, said first oil-filled seal chamber, and said first oil return line.

2. The seal apparatus according to claim 1,
    wherein said seal arrangement further comprises another seal ring arranged circumferentially around said shaft and axially spaced from said first seal ring toward said hull exterior side, and a gas-filled seal chamber bounded between said another seal ring and said first seal ring, and
    wherein said apparatus further comprises a pressurized gas source, a gas supply line connecting said pressurized gas source to said gas-filled seal chamber, a drain line communicating out of said gas-filled seal chamber to said hull interior side, and a valve in said drain line.

3. The seal apparatus according to claim 2, wherein said seal arrangement further comprises a further seal ring arranged circumferentially around said shaft and axially spaced from said another seal ring toward said hull exterior side, a water-filled seal chamber bounded between said further seal ring and said another seal ring, and a water passage communicating between said water-filled seal chamber and an exterior environment on said hull exterior side.

4. The seal apparatus according to claim 3, wherein said further seal ring, said another seal ring and said first seal ring are each configured and oriented with a tilt or taper toward said hull exterior side, and said second seal ring is configured and oriented with a tilt or taper toward said hull interior side.

5. The seal apparatus according to claim 2, further comprising a pressurizing line that communicates from said pressurized gas source to said first oil tank.

6. The seal apparatus according to claim 1, further comprising a compressed air source and a pressurizing line that communicates from said compressed air source to said first oil tank.

7. The seal apparatus according to claim 1, wherein said first oil tank is located such that an oil level of said oil in said first oil tank is from 0.5 m to 4 m above a shaft centerline of said shaft.

8. The seal apparatus according to claim 1, wherein said first oil tank is located such that an oil level of said oil in said first oil tank is located above a waterline of said hull of said watercraft.

9. The seal apparatus according to claim 1, wherein said seal arrangement further comprises a second oil-filled seal chamber bounded between said second seal ring and a third seal ring that is arranged circumferentially around said shaft and axially spaced from said second seal ring toward said hull interior side, wherein an inlet and an outlet of said second oil-filled seal chamber are connected to said oil circulation arrangement.

10. The seal apparatus according to claim 9, wherein said oil circulation arrangement further comprises a second oil tank, a second oil supply line communicating from said second oil tank to said inlet of said second oil-filled seal chamber, a second circulation pump interposed in said second oil supply line between said second oil tank and said second oil-filled seal chamber, and a second oil return line communicating from said outlet of said second oil-filled seal chamber to said second oil tank.

11. The seal apparatus according to claim 10, wherein said first seal ring and said third seal ring are each conically tapered or tilted toward said hull exterior side, and said second seal ring is conically tapered or tilted toward said hull interior side.

12. The seal apparatus according to claim 9,
wherein said seal arrangement further comprises a third oil-filled seal chamber bounded between said third seal ring and a fourth seal ring that is arranged circumferentially around said shaft and axially spaced from said third seal ring toward said hull interior side, and
wherein said oil circulation arrangement further comprises a further oil tank, a further oil supply line communicating from said further oil tank to said third oil-filled seal chamber, a further circulation pump interposed in said further oil supply line between said further oil tank and said third oil-filled seal chamber, and a further oil return line communicating from said third oil-filled seal chamber to said further oil tank.

13. The seal apparatus according to claim 12, wherein said further oil tank is arranged at a height of 0.5 m to 4 m above a shaft centerline of said shaft.

14. The seal apparatus according to claim 12, wherein said first, third and fourth seal rings are each conically tapered or tilted toward said hull exterior side, and said second seal ring is conically tapered or tilted toward said hull interior side.

15. The seal apparatus according to claim 1, wherein said oil circulation arrangement further comprises a filter for separating solid particles and/or water from said oil, and wherein said filter is interposed in said first oil supply line between said first oil tank and said first oil-filled seal chamber.

16. The seal apparatus according to claim 15, wherein said oil circulation arrangement further comprises a water accumulation sensor in said filter.

17. The seal apparatus according to claim 15, wherein said oil circulation arrangement further comprises:
    an oil flow meter arranged in series with said first circulation pump and said filter in said first oil supply line between said first oil tank and said first oil-filled seal chamber,
    a bypass line communicating from said first oil tank to said first oil-filled seal chamber parallel to said oil flow meter, said first circulation pump and said filter, and
    an actuator-driven bypass valve interposed in said bypass line between said first oil tank and said first oil-filled seal chamber,
    wherein said oil flow meter and said actuator-driven bypass valve are connected for signal transmission such that a signal from said oil flow meter can actuate said actuator-driven bypass valve.

18. The seal apparatus according to claim 1, wherein said oil circulation arrangement further comprises an oil cooler interposed in said first oil supply line between said first oil tank and said first oil-filled seal chamber.

19. The seal apparatus according to claim 1, wherein said oil circulation arrangement further comprises a secondary circulation circuit including a secondary circuit pump and a secondary circuit filter arranged in a secondary circulation line attached to said first oil tank.

20. The seal apparatus according to claim 1, wherein said upper portion of said first oil-filled seal chamber is above said lower portion of said first oil-filled seal chamber with respect to earth's gravity, and wherein said first circulation pump is configured and arranged to pump said oil in a direction from said first oil tank, through said first oil supply line, through said first oil-filled seal chamber, through said first oil return line, back to said first oil tank.

* * * * *